United States Patent
Mera et al.

(10) Patent No.: US 8,725,962 B2
(45) Date of Patent: May 13, 2014

(54) DEVICE AND METHOD FOR REWRITING MAIN MEMORY DATA

(75) Inventors: Keisuke Mera, Kawasaki (JP); Takeshi Ishihara, Yokohama (JP); Nobuhiko Sugasawa, Kawasaki (JP)

(73) Assignee: Kabushiki Kaisha Toshiba, Minata-ku, Tokyo (JP)

( * ) Notice: Subject to any disclaimer, the term of this patent is extended or adjusted under 35 U.S.C. 154(b) by 1211 days.

(21) Appl. No.: 12/561,700

(22) Filed: Sep. 17, 2009

(65) Prior Publication Data
US 2010/0125710 A1  May 20, 2010

(30) Foreign Application Priority Data

Nov. 14, 2008 (JP) ................................ 2008-292238

(51) Int. Cl.
*G06F 12/00* (2006.01)
*G06F 12/02* (2006.01)
(52) U.S. Cl.
CPC .................................. *G06F 12/0246* (2013.01)
USPC ............. 711/159; 711/E12.069; 711/E12.103
(58) Field of Classification Search
CPC .................................................. G06F 12/0246
USPC ......................................................... 711/159
See application file for complete search history.

(56) References Cited

U.S. PATENT DOCUMENTS

| 7,814,195 B2 * | 10/2010 | Dacosta ........................ 709/224 |
| 2004/0199733 A1 * | 10/2004 | Watanabe et al. ............. 711/162 |
| 2006/0192993 A1 * | 8/2006 | Omotani ....................... 358/1.15 |
| 2008/0239552 A1 * | 10/2008 | Kimura ............................ 360/75 |
| 2009/0049240 A1 * | 2/2009 | Oe et al. ........................ 711/114 |

FOREIGN PATENT DOCUMENTS

| JP | 2001-257735 A | 9/2001 |
| JP | 2002-290596 A | 10/2002 |
| JP | 2006-270581 A | 10/2006 |
| JP | 2006-301960 A | 11/2006 |
| JP | 2007-134978 A | 5/2007 |

OTHER PUBLICATIONS

Office Action dated May 15, 2012 from corresponding JP 2008-292238.
http://www.lxr.linux.no/linuxtv2.6.26/documentation/power/swsusp.txt, Jul. 21, 2009, 7 pages.

* cited by examiner

*Primary Examiner* — Reginald Bragdon
*Assistant Examiner* — Aracelis Ruiz
(74) *Attorney, Agent, or Firm* — Ohlandt, Greeley, Ruggiero & Perle, L.L.P.

(57) ABSTRACT

A main memory data rewriting device includes a rewrite condition analysis unit configured to analyze a rewrite condition for target data in main memory data stored in a main memory before deactivation of an information processing device, and create a first processing content to acquire environment data substituting the target data from outside of the information processing device and a second processing content to rewrite the target data to the environment data, an environment data processing unit configured to acquire the environment data according to the first processing content when the information processing device is temporarily activated at an activation time set to rewrite the target data during a deactivating period of the information processing device, and a rewrite processing unit configured to rewrite a region of a nonvolatile storage medium in which the target data is stored with the environment data according to the second processing content.

9 Claims, 9 Drawing Sheets

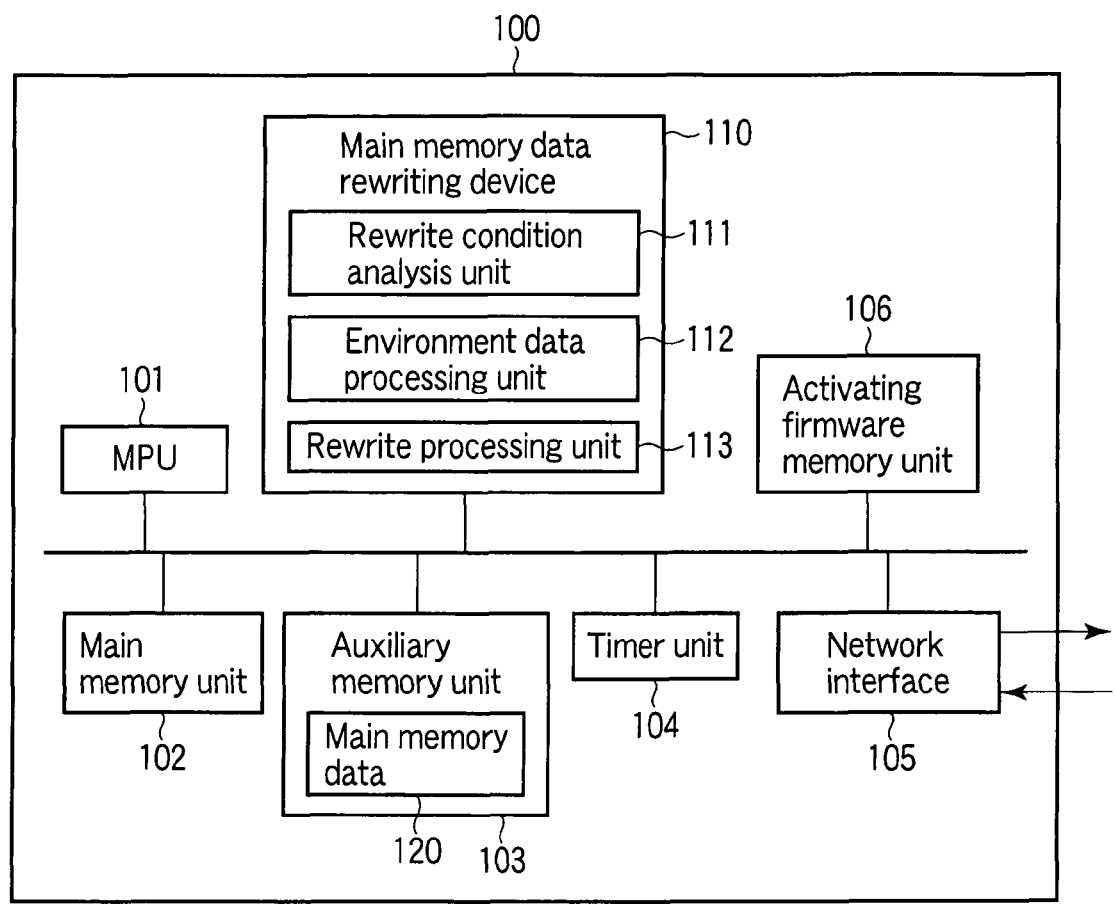
F I G. 1

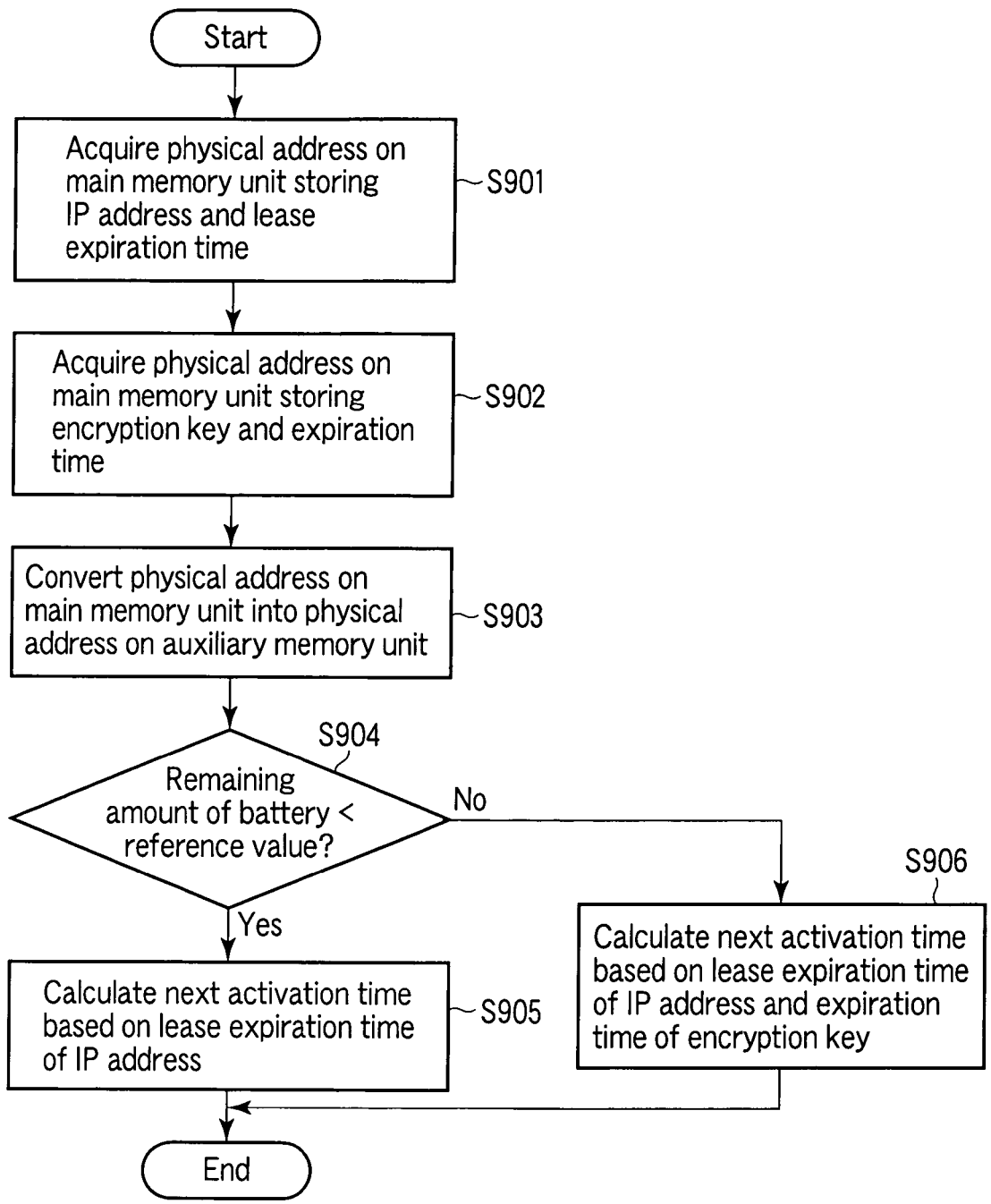
F I G. 9

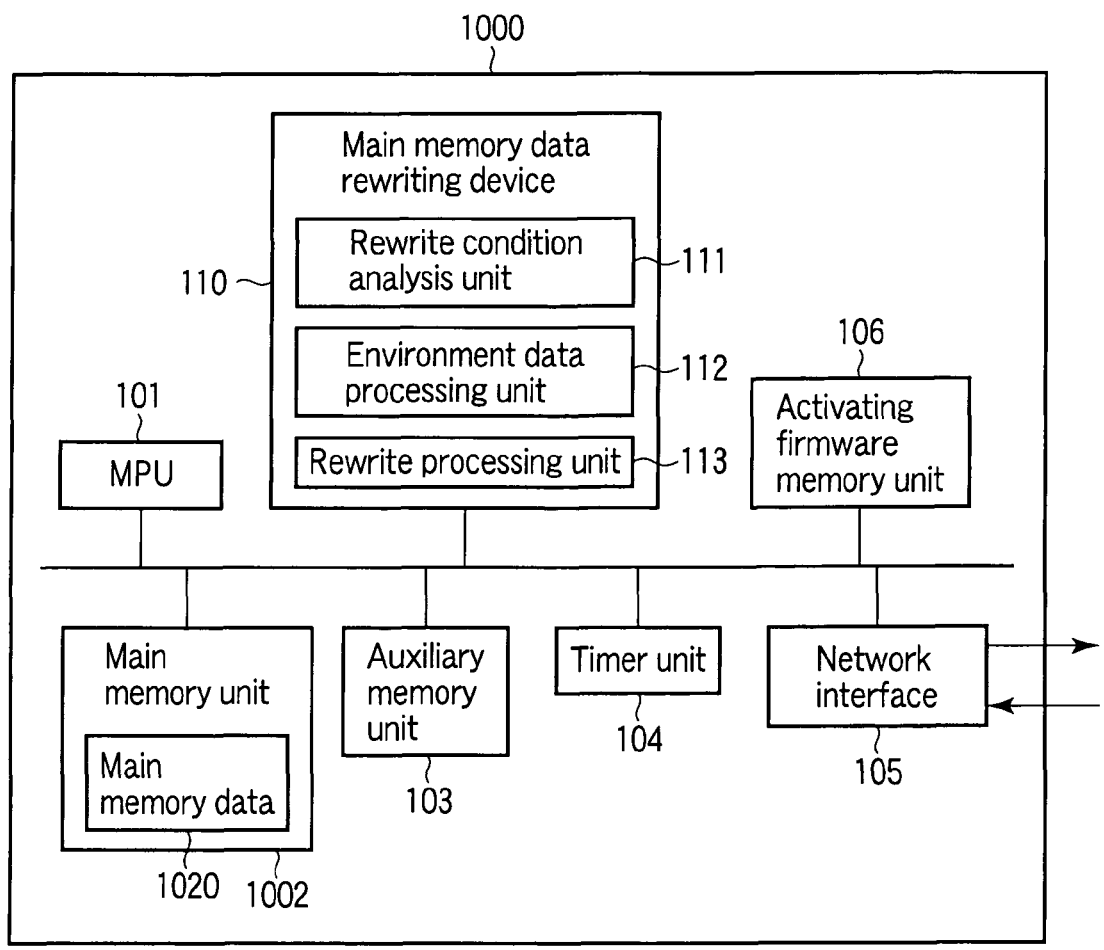
F I G. 10

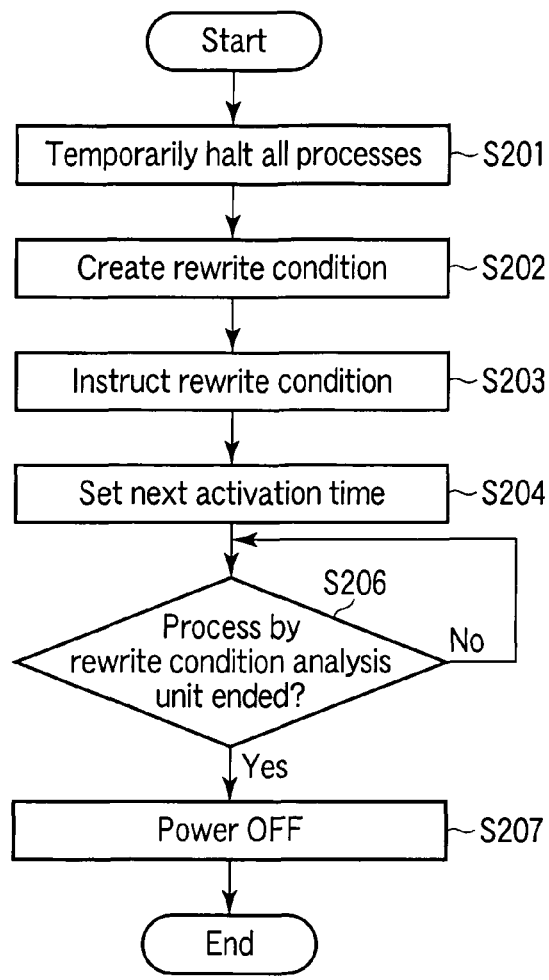
F I G. 11
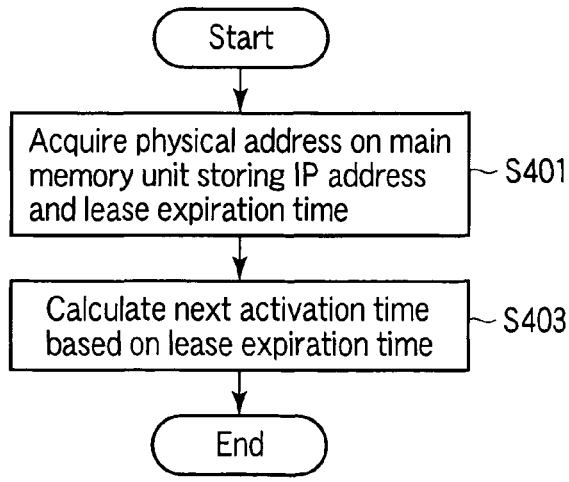
F I G. 12

DEVICE AND METHOD FOR REWRITING MAIN MEMORY DATA

CROSS-REFERENCE TO RELATED APPLICATIONS

This application is based upon and claims the benefit of priority from prior Japanese Patent Application No. 2008-292238, filed Nov. 14, 2008, the entire contents of which are incorporated herein by reference.

BACKGROUND OF THE INVENTION

1. Field of the Invention

The present invention relates to a device and method for rewriting main memory data in a deactivating period.

2. Description of the Related Art

Recently, various information processing devices, typified by personal computers (PC), are used by many users. Information processing devices are provided with a plurality of deactivation schemes to adapt to various usage aspects of users. The simplest deactivation scheme is merely to power off an information processing device (i.e., shutdown). Often, however, volatile storage media excellent in access rate are used for main memories of information processing devices. In this case, since main memory data is lost when the information processing device is powered off, much time is required before the information processing device is restored to its previous working state from resumption of operation. That is, shutdown is unsuitable for a usage aspect in which a user temporarily suspends a work.

Meanwhile, other deactivation schemes ("suspend", "standby", and so forth) capable of quickly being restored to its previous working state from resumption of operation by continuing power supply to the main memory in a power-saving mode to maintain main memory data has been also known. Although the suspend consumes power to some extent during a deactivating period, the suspend is useful in that the previous working state can be quickly restored from resumption of the operation, as described above. Further, "Linux Software Suspend"<URL: http://lxr.linux.no/linux+v.2.6.26/Documentation/power/swsusp.txt> (hereinafter simply referred to as related art) presents a deactivation scheme ("hibernation" or "software suspend") capable of quickly being restored to its previous working state from resumption of operation and suppressing power consumption, compared to the suspend, by temporarily saving main memory data in an auxiliary storage device, for example, formed of a nonvolatile storage medium, before deactivation of the information processing device.

Further, Japanese Patent No. 3882452 (page. 12, FIG. 2) presents an operation resumption scheme intended to prevent failure to receive data (packets) via a network in a period (hereinafter simply referred to as activation preparation period) from when a communication device is powered on until when a central processing unit (CPU) completes activation. The communication device is provided with a sub memory means separate from a main memory means, and data received during the activation preparation period is temporarily stored in the sub memory means. After completion of activation of the CPU, the data stored in the sub memory means is copied by the main memory means. Thus, according to the communication device disclosed in Japanese Patent No. 3882452, failure to receive data during the activation preparation period can be prevented.

Further, a method of synchronizing a call information server disclosed in JP-A 2006-270581 (KOKAI) (page. 7, FIG. 1) attains redundancy by forming a call information server by an active server and a standby server physically separated from each other, and uses a remote direct memory access (RDMA) function to synchronize data between the two servers. Thus, according to the method of synchronizing the call information server disclosed in JP-A 2006-270581 (KOKAI), the standby server as a substitute means continues to operate when the active server goes down for some reason, and thereby high reliability can be expected.

For example, according to "software suspend (hibernation)" disclosed in the related art, an information processing device is capable of quickly being restored to its previous working state from resumption of operation, and preventing power consumption during a deactivating period. The main memory data may include data types such as data in which expiration data is set, or data the contents of which are changed with passage of time. That is, when a deactivating period of the information processing device is relatively long, the main memory data held in a nonvolatile storage medium may partially lapse, or its contents may become old. Accordingly, even when operation of the information processing device is resumed, data belonging to the data type needs to be updated, which may prevent the information processing device from being restored to its previous working state smoothly. It is to be noted that means for rewriting main memory data maintained in a nonvolatile storage medium in a deactivating period of an information processing device is disclosed neither in Japanese Patent No. 3882452 nor JP-A 2006-270581 (KOKAI).

BRIEF SUMMARY OF THE INVENTION

According to an aspect of the invention, there is provided a main memory data rewriting device comprising: a rewrite condition analysis unit configured to analyze a rewrite condition for target data in main memory data stored in a main memory before deactivation of an information processing device, and create a first processing content to acquire environment data substituting the target data from outside of the information processing device and a second processing content to rewrite the target data to the environment data, the rewrite condition being created by an operating system having a function of deactivating the information processing device in maintaining the main memory data in a nonvolatile storage medium over a deactivating period of the information processing device; an environment data processing unit configured to acquire the environment data according to the first processing content when the information processing device is temporarily activated at an activation time set to rewrite the target data during the deactivating period; and a rewrite processing unit configured to rewrite a region of the nonvolatile storage medium in which the target data is stored with the environment data according to the second processing content.

BRIEF DESCRIPTION OF THE SEVERAL VIEWS OF THE DRAWING

FIG. 1 is a block diagram illustrating an information processing device in which a device for rewriting main memory data is incorporated according to the first embodiment.

FIG. 9 is a flowchart illustrating a specific example of a rewrite condition creating process by an OS being executed by an MPU of FIG. 8.

FIG. 10 is a block diagram illustrating an information processing device in which a device for rewriting main memory data is incorporated according to the second embodiment.

FIG. 11 is a flowchart illustrating a hibernation transition process performed by an OS being executed by an MPU of FIG. 10.

FIG. 12 is a flowchart illustrating a specific example of a rewrite condition creating process performed by the OS being executed by the MPU of FIG. 10.

DETAILED DESCRIPTION OF THE INVENTION

Figure 2:
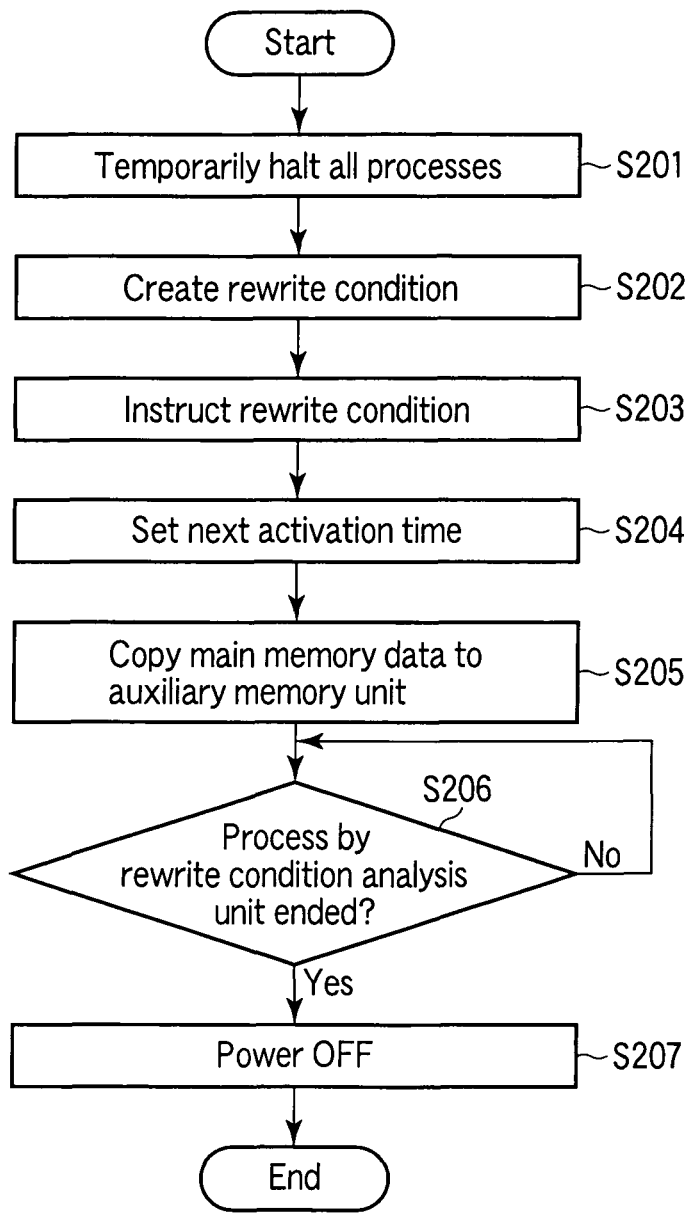
FIG. 2 is a flowchart illustrating a hibernation transition process by an OS being executed by an MPU of FIG. 1.

Hereinafter, embodiments of present invention will be described with reference to the accompanying drawings.

(First Embodiment)

As shown in FIG. 1, an information processing device 100 according to the first embodiment of present invention, in which a main memory data rewriting device 110 is incorporated, comprises a micro processing unit (MPU) 101, a main memory unit 102, an auxiliary memory device 103, a timer unit 104, a network interface 105, and a activating firmware memory unit 106.

The MPU 101 is a device capable of executing processing regarding various types of software including an operating system (hereinafter simply referred to as OS). Most commonly, the MPU 101 is formed of a general-purpose processor, but may be formed of an dedicated semiconductor processor such as a large scale integration (LSI) or application specific integrated circuit (ASIC). The MPU 101 may be formed of a reconfigurable processor called a Field Programmable Gate Array (FPGA), or may be formed of a dynamically reconfigurable processor. The MPU 101 may be formed of a multi-core processor having a plurality of cores, or a plurality of MPUs 101 may be formed on the information processing device 100.

In the descriptions that follow, the term OS contains a service ("daemon") which manages functions of a kernel and functions executed by the information processing device 100 using the functions of the kernel, and software (application) which executes information processing using the various functions, as well as the kernel as a nucleus part. Note that software corresponding to a main memory data rewriting program for operating the information processing device as the main memory data rewriting device 110, which will be described later, is not software contained in the term OS.

The main memory unit 102 temporarily stores data necessary for software executed by the MPU 101. The main memory unit 102 is formed of a volatile storage medium, and stored data is lost upon interruption (stop) of the power supply. The main memory unit 102 is formed of a static random access memory (SRAM) or a dynamic random access memory (DRAM), for example.

The auxiliary memory unit 103 stores software executed by the MPU 101, and data to be processed by the software. The auxiliary memory unit 103 is formed of a nonvolatile storage medium, and stored data is not lost even when the power supply is stopped. The auxiliary memory unit 103 is formed of a hard disc drive (HDD), which is a magnetic storage medium, or a semiconductor storage medium such as a NOR-type flash memory, a NAND-type flash memory, and a solid state drive (SSD), for example. When an OS being executed by the MPU 101 transits to hibernation, the main memory data 120 stored in the main memory unit 102 is saved (copied) in the auxiliary memory unit 103 by the function of the OS. The main memory data 120 is copied again in the main memory unit 102 upon resumption of operation of the information processing device 100.

Note that the term hibernation refers to deactivation of an information processing device in maintaining main memory data in a nonvolatile storage medium before deactivation during a deactivating period, to allow quick restoration of the information processing device to its previous working state from resumption of operation. That is, when the main memory is formed of a volatile storage medium as in the case of the information processing device 100 of the present embodiment, the hibernation refers to powering off the information processing device while temporarily saving the main memory data in a nonvolatile storage medium different from the main memory. When the main memory is formed of a nonvolatile storage medium, on the other hand, the hibernation refers to powering off the information processing device while maintaining the main memory data in the main memory.

The timer unit 104 measures the time regardless of whether the information processing device 100 is powered on or off. When the measured time has reached a preset next activation time during a deactivating period of the information processing device 100, the information processing device 100 is switched to be powered on.

The network interface 105 is a device for allowing the information processing device 100 to transmit and receive data to and from an external information processing device. The network interface 105 may be an interface for cable communications, such as Ethernet (registered trademark), ISDN (registered trademark), and FAX Modem, or may be an interface for wireless communications such as WiFi (registered trademark) (wireless LAN) and a cellular phone. Further, FIG. 1 illustrates one network interface 105, but a plurality of network interfaces 105 may be provided.

The activating firmware memory unit 106 stores an activating firmware having a function of recognizing each component of the information processing device 100, an initialization function, and so forth. The activating firmware memory unit 106 is formed of a nonvolatile storage medium. The activating firmware memory unit 106 may be formed as a partial region of the auxiliary memory unit 103, or may be formed independently from the auxiliary memory unit 103. The activating firmware is, for example, Basic Input Output System (BIOS), Extensible Firmware Interface (EFI), or software which executes a process similar to that of BIOS using EFI. The activating firmware may have a function of setting a next activation time in the timer unit 104. Further, the activating firmware has a function of determining, based on preset conditions, whether to start a process regarding the main memory data rewriting device 110, which will be described later, or a process regarding software, such as the OS, stored in the auxiliary memory unit 103.

The above-described preset conditions are, for example, information used for conditional branching of the firmware; for example, when the information processing device 100 is switched to be powered on by the function of the timer unit 104, a process regarding the main memory data rewriting device 110 is started, and when the information processing device 100 is switched to be powered on by other triggers (press-down of a power button of the information processing device 100 by the user, for example), a process regarding software such as an OS stored in the auxiliary memory unit 103 is started.

The main memory data rewriting device 110 includes the rewrite condition analysis unit 111, the environment data processing unit 112 and the rewrite processing unit 113, which in cooperation perform a main memory data rewriting process. Note that the main memory data rewriting process is a process of rewriting main memory data properly in a deactivating period of an information processing device according to rewrite conditions corresponding to data to be rewritten specified in advance by an OS before deactivation of the information processing device 100. The main memory data rewriting device 110 may be formed of an dedicated semiconductor processor such as LSI and ASIC, may be formed of a general-purpose processor similar to MPU 101, may be formed of FPGA, which is a reconfigurable processor, or may be formed of a dynamically reconfigurable processor.

The rewrite condition analysis unit 111 acquires, from an OS being executed by the MPU 101, a rewrite condition regarding data to be rewritten belonging to the data type which may need to be rewritten from among various data types included in the main memory data, and analyzes the rewrite condition for each item of data to be rewritten. The rewrite condition analysis unit 111 creates contents of the process to be executed by each of the environment data processing unit 112 and the rewrite processing unit 113 based on the result of analysis of the rewrite condition.

The environment data processing unit 112 acquires information (hereinafter simply referred to as environment data) from outside of the information processing device 100 via the network interface 105 based on the contents of the process created by the rewrite condition analysis unit 111, and analyzes the environment data. If the analysis shows that the environment data belongs to a data type to be rewritten (that is, when the environment data is substitute data for data to be rewritten), the environment data processing unit 112 inputs the environment data into the rewrite processing unit 113. Functions necessary for the environment data processing unit 112 differ depending on the data type to which the data to be rewritten belongs. For example, the environment data processing unit 112 acquires an Internet Protocol (IP) address assigned to the network interface 105 and a lease expiration time of the IP address as the environment data via the network interface 105 based on dynamic host configuration protocol (DHCP), and inputs the acquired IP address and the lease expiration time of the IP address to the rewrite processing unit 113. In this example, the environment data processing unit 112 needs a function of controlling the network interface 105, a function of performing communications by the Ethernet protocol, and a function of acquiring an IP address based on the DHCP.

The rewrite processing unit 113 rewrites the main memory data 120 temporarily saved in the auxiliary memory unit 103 using the environment data from the environment data processing unit 112, based on the contents of the process created by the rewrite condition analysis unit 111.

Hereinafter, a hibernation transition process performed by the OS being executed by the MPU 101 will be described with reference to FIG. 2.

First, the OS temporarily halts all the processes being executed (step S201). Next, the OS creates rewrite conditions for data to be rewritten belonging to a data type (i.e., data type which may have expired or the contents of which may become old during a deactivating period) which is included in the main memory data and may need to be rewritten in a deactivating period (step S202). Specific examples of rewrite conditions created in step S202 will be described later. The rewrite conditions may be set in advance, or may be created whenever the hibernation transition process is performed.

Figure 4:
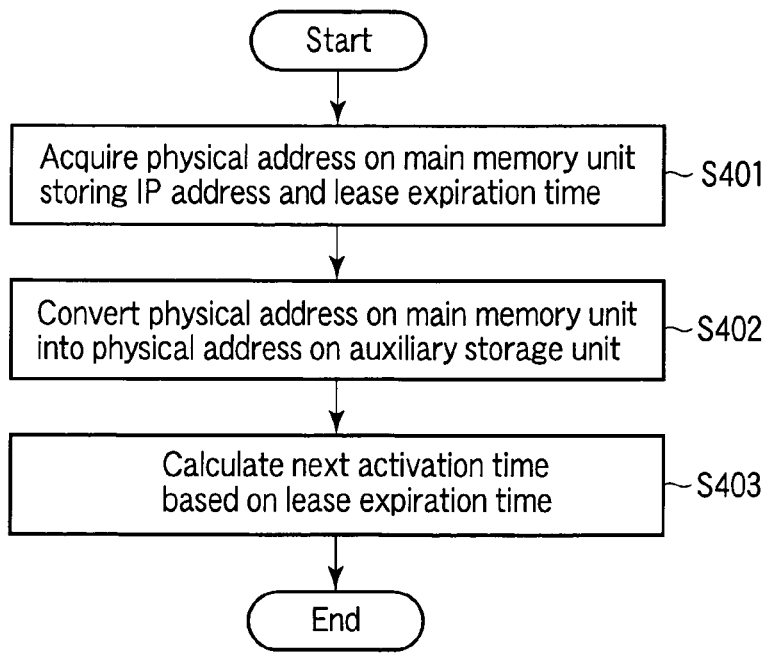
FIG. 4 is a flowchart illustrating a specific example of a rewrite condition creating process performed by the OS being executed by the MPU of FIG. 1.

An example of specific contents of the process in step S202 will be described with reference to FIG. 4. In this example, an IP address acquired based on the DHCP and a lease expiration time of the IP address are data types to be rewritten.

First, the OS converts a virtual address of a memory region storing an IP address assigned to the network interface 105 and a lease expiration of the IP address (DHCP lease expiration) into a physical address on the main memory unit 102, with reference to a page table of a memory management unit (MMU) or translation lookaside buffer (TLB) (step S401). When the physical regions are not crowded under the influence of segment, paging, or so forth, and are segmented into a plurality of subregions physically isolated from one another, the OS may acquire physical addresses identifying the subregions.

Next, the OS converts the physical address on the main memory unit 102 acquired in step S401 into a physical address on the auxiliary memory unit 103 (step S402). That is, the OS creates a physical address indicating a physical region (region to be rewritten) on the auxiliary memory unit 103, in which data (data to be rewritten) belonging to a data type to be rewritten is saved in a deactivating period of the information processing device 100, as part of a rewrite condition.

Then, the OS calculates a next activation time based on the lease expiration of the IP address (step S403), and the process exits. That is, the OS creates a next activation time at which the information processing device 100 should be temporarily activated as part of the rewrite conditions to allow the main memory data rewriting device 110 to rewrite data to be rewritten. Note that an arbitrary scheme may be used to calculate the next activation time, and a time an hour before the lease expiration may be set as the next activation time, for example.

The OS instructs the rewrite condition analysis unit 111 about the rewrite condition created in step S202 (step S203). An arbitrary scheme may be used to instruct the rewrite conditions in step S203; for example, a memory mapped I/O scheme, i.e., a scheme of writing a rewrite condition in a region for the main memory data rewriting device 110 which is provided in the main memory unit 102, and causing the main memory data rewriting device 110 to read the rewrite condition, or a scheme of writing a rewrite condition in another memory managed by the main memory data writing device 110 and causing the main memory data rewriting device 110 to read the rewrite condition.

After that, the OS sets the next activation time in the timer unit 104 (step S204). More specifically, since the OS calculates a next activation time as part of a rewrite condition for each item of data to be rewritten in step S202, a next activation time that comes in the nearest future among the next activation times calculated for each item of the data to be rewritten is set in the timer unit 104. Setting of the next activation time in the timer unit 104 may be performed by utilizing the function of the activating firmware stored in the activating firmware memory unit 106 or may be performed directly by the OS.

After that, the OS saves the main memory data 120 in the auxiliary memory unit 103 (step S205). The scheme of saving the main memory data 120 is not particularly limited, and a scheme that can be used in hibernation may be used as appropriate. When the process of the rewrite condition analysis unit 111 for the rewrite condition instructed in step S203 is completed (step S206), the OS powers off the information processing device 100 to deactivate the information processing device 100, and the process exits.

Figure 3:
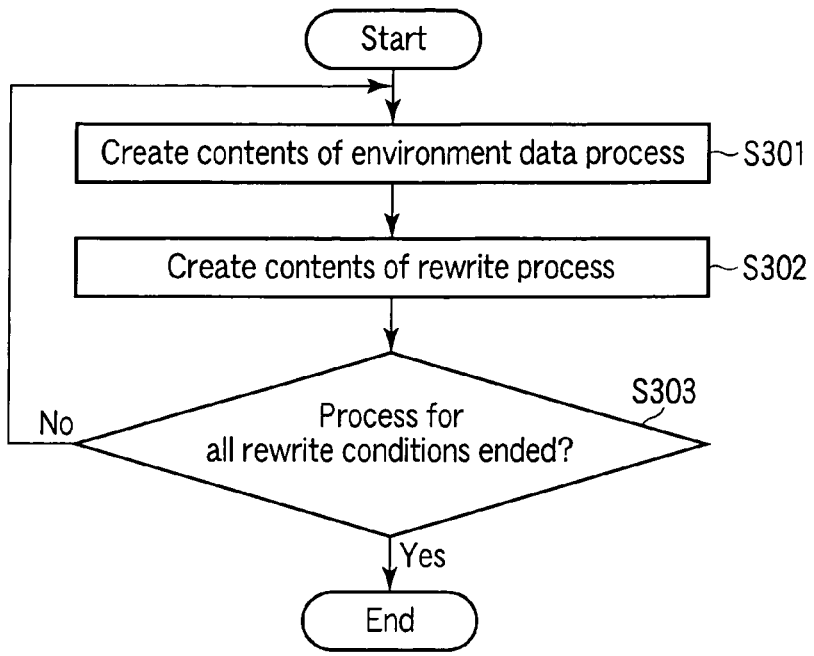
FIG. 3 is a flowchart illustrating an operation of a rewrite condition analysis unit of FIG. 1.

Hereinafter, the operation of the rewrite condition analysis unit 111 will be described with reference to FIG. 3.

When a rewrite condition is instructed by an OS being executed in MPU 101 in the above-described step S203, the rewrite condition analysis unit 111 starts an operation, and the process proceeds with step S301.

In step S301, the rewrite condition analysis unit 111 creates, based on the rewrite condition, contents of an environment data process that should be executed by the environment data processing unit 112. For example, when the rewrite condition is created according to the flowchart of FIG. 4, contents of the environment data process include at least (a) performing communications according to the DHCP via the network interface 105, and (b) updating an IP address assigned to the network interface 105. Since the contents of environment data process are performed in a deactivating period of the information processing device 100, the contents of environment data process are stored in a nonvolatile storage medium such as the auxiliary memory unit 103 incorporated in the information processing device 100 to avoid being lost due to interruption of power supply. The contents of environment data process may be stored in an arbitrary data form in an arbitrary nonvolatile storage medium.

After that, the rewrite condition analysis unit 111 creates, based on the rewrite condition, contents of the rewrite process to be executed by the rewrite processing unit 113 (step S302). For example, when the rewrite condition is created according to the above-described flowchart of FIG. 4, the contents of the rewriting process include at least writing an IP address updated by the environment data processing unit 111 and a lease expiration time of the IP address in a region to be rewritten on the auxiliary memory unit 103 identified by a physical address in a rewrite condition. Since the contents of the rewriting process are performed in a deactivating period of the information processing device 100, the contents of the rewriting process are stored in a nonvolatile storage medium such as the auxiliary memory unit 103 incorporated in the information processing device 100 to avoid being lost due to interruption of the power supply. The rewriting process content may be stored in an arbitrary data form in an arbitrary nonvolatile storage medium.

When processing of all the rewrite conditions instructed by the OS is finished, the rewrite condition analysis unit 111 finishes operating, and if not, the process returns to step S301 to process unprocessed rewrite conditions. Note that step S301 and step S302 may be executed in an arbitrary order unless data dependence in processing exists between the steps. Whether the data dependence exists or not is determined by the implementing aspect of processing in steps S301 and S302.

Hereinafter, a main memory data rewriting process performed by the main memory data rewriting device 110 will be described with reference to FIGS. 5 and 6. In the descriptions that follow, the rewrite conditions are created according to the flowchart of FIG. 4.

When the measured time has reached a next activation time set in the above-described step S204, for example, the timer unit 104 powers on the information processing device 100. After that, the activating firmware is executed, and the main memory data rewriting device 110 starts to operate.

First, the environment data processing unit 112 reads contents of an environment data process created in advance by the rewrite condition analysis unit 111 (see step S301) from a nonvolatile storage medium, and the process proceeds with step S501.

In step S501, the environment data processing unit 112 invokes a protocol process, i.e., the DHCP process. The environment data processing unit 112 then performs communications according to the DHCP via the network interface 105 to update an IP address assigned to the network interface 105, and acquires an updated IP address and a lease expiration time of the IP address (step S502). The environment data processing unit 112 then activates the rewrite processing unit 113 (step S503).

If the environment data process for all the data types is finished, the process proceeds with step S505, and if not, the process returns to step S501 to perform environment data process for unprocessed data types. The environment data processing unit 112 calculates a next activation time and set it in the timer unit 104 in step S505, and the process exits. The contents of the process in step S505 may be same as or different from the contents of the process in step S204.

When activated by the environment data processing unit 112, the rewrite processing unit 113 reads contents of the rewrite process created in advance by the rewrite condition analysis unit 111 (see step S302) from a nonvolatile storage medium, and the process proceeds with step S601.

In step S601, the rewrite processing unit 113 rewrites a region to be rewritten in the auxiliary memory unit 103, which is identified by the physical address in the rewrite condition with the IP address and a lease expiration time of the IP address acquired in step S502. That is, the rewrite processing unit 113 rewrites data included in the main memory data 120 saved in the auxiliary memory unit 103 and corresponding to the previous IP address and the lease expiration time of the IP address.

Figure 5:
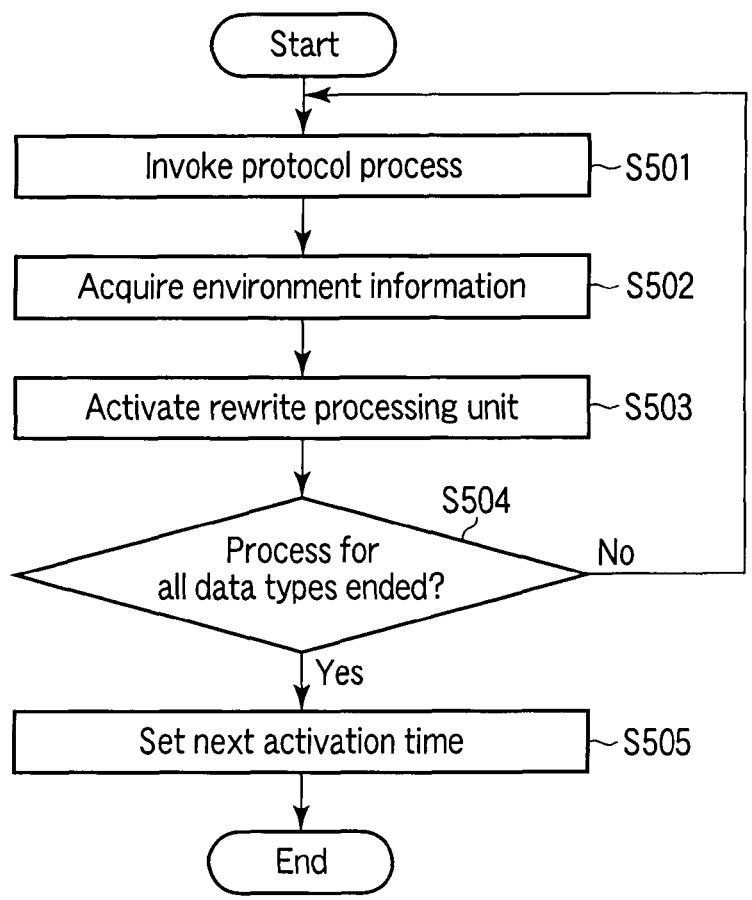
FIG. 5 is a flowchart illustrating an operation of an environment data processing unit of FIG. 1.
Figure 6:
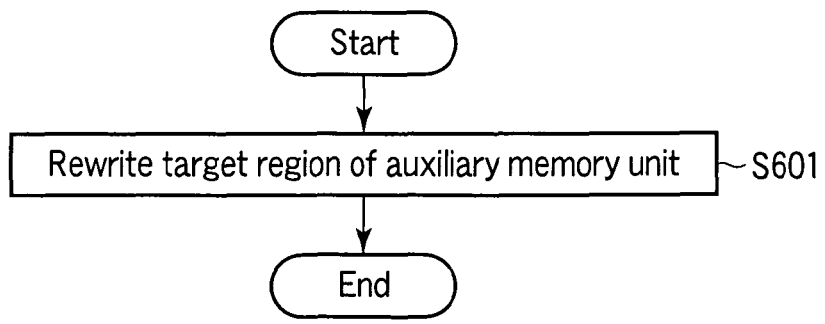
FIG. 6 is a flowchart illustrating an operation of a rewrite processing unit of FIG. 1.

When the processes of the FIG. 5 and FIG. 6 exit, the main memory data rewriting device 110 powers off the information processing device 100 to deactivate it. The main memory data rewriting device 110 performs the above-described series of operations of rewriting main memory data until resumption (i.e., restoration to its previous working state) of operation of the information processing device 100. When the information processing device 100 is powered on by operation (press-down of a power button, for example) of a user, a process to resume operation is performed. Any process that can be used with the hibernation technique may be applied to the process for resumption of the operation; for example, a process to write main memory data stored in the auxiliary memory unit 103 may be applied. When an IP address and a lease expiration time of the IP address is rewritten, even when the lease expiration time of the previous IP address is over (has expired), the OS can perform communications immediately without acquiring a new IP address.

The IP address and the lease expiration time of the IP address have been described above as an example of data type to be rewritten, but the data types that can be rewritten by the main memory data rewriting device of the present embodiment are not limited thereto. For example, an IPv6 address which can be acquired through communications according to DHCPv6 and an expiration time of the IPv6 address may be rewritten in the main memory data rewriting process.

When the network interface 105 of the information processing device 100 performs virtual private network (VPN) communications (Security Architecture for Internet Protocol (IPsec), for example), encryption is performed for communication data (packets) using an encryption key for concealment of VPN communications. From the viewpoint of security, an expiration time is often set for the encryption key, which needs periodical update. That is, the encryption key may lapse during the deactivating period of the information processing device 100. In this case, by making the encryption key and the expiration time of the encryption key targets of the main memory data rewriting process, an encrypted key which is valid upon resumption of operation of the information processing device 100 can be immediately used. A new encryption key may be acquired using a protocol for updating VPN encryption keys (such as Internet Key Exchange (IKE) or Kerberized Internet Negotiation of Keys (KINK), for example) as appropriate.

An OS or software or data files operated on an OS are sometimes updated via the network interface 105 of the information processing device 100. For example, in order to sufficiently utilize anti-virus software against computer viruses, data files for detecting viruses should desirably be updated periodically. By making the virus pattern file a target of the main memory data rewriting process, anti-virus software can be performed immediately using a state-of-the-art virus pattern file upon resumption of operation of the information processing device 100.

Furthermore, the region to be rewritten in the auxiliary memory unit 103 may be segmented into a plurality of subregions physically isolated from one other.

In this case, the rewrite condition analysis unit 111 and the rewrite processing unit 113 are configured to be capable of handling a plurality of physical addresses which identify the respective subregions. That is, the rewrite condition analysis unit 111 creates contents of the rewrite process to segment and rewrite main memory data into a plurality of subregions specified by the plurality of physical addresses, and the rewrite processing unit 113 segments and rewrites the main memory data into the subregions according to the contents of the rewrite process.

As described above, the main memory data rewriting device according to the present embodiment rewrites main memory data saved in an auxiliary storage device during a deactivating period of an information processing device according to a rewrite condition created for each item of data which may be rewritten in a deactivating period by an OS before deactivation of the information processing device. Consequently, according to the main memory data rewriting device of the present embodiment, main memory data maintained in a nonvolatile storage medium in a deactivating period of an information processing device can be rewritten. That is, according to the main memory data rewriting device according to the present embodiment, enhanced speed of resumption of the operation of the information processing device can be achieved.

Hereinafter, three modifications of the present embodiment will be described. Note that the first to third modifications, which will be described below, merely show representative modifications, and should not be considered to limit the technical scope of the present embodiment. The first to third modifications may be used as appropriate as modifications of the second to fourth embodiments, which will be described later.

(First Modification)

A main memory data rewriting device 110 according to the first modification of the present embodiment is different from the main memory data rewriting device 110 according to the above-described first embodiment in that data to be rewritten is inspected for abnormalities.

An OS creates data for inspection of data to be rewritten as a rewrite condition in a rewrite condition creating process (above-described step 202). The data for inspection may be data to be rewritten itself, or a digest value obtained by applying a unidirectional function to the data to be rewritten, for example. A hash function such as MD5 and SHA1, and a function for calculating cyclic redundancy check (CRC) may be used as the unidirectional function, and which unidirectional function to use is a matter of design.

Figure 7:
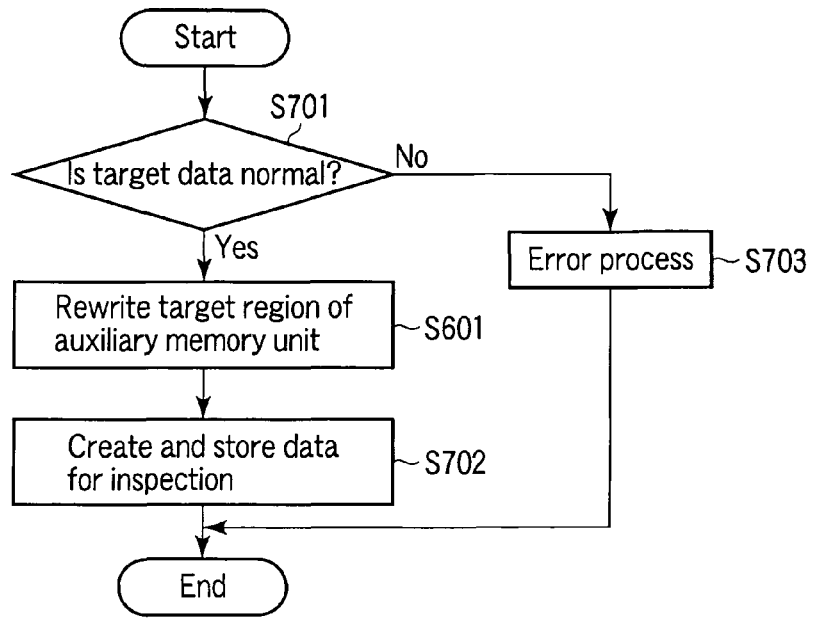
FIG. 7 is a flowchart illustrating a modification of FIG. 6.

A rewrite condition analysis unit 111 adds inspection of data to be rewritten based on the data for inspection to the contents of the process of the rewrite processing unit 113. The rewrite processing unit 113 performs an operation shown in FIG. 7, for example, during a deactivating period of the information processing device 100.

First, the rewrite processing unit 113 inspects the data to be rewritten to determine whether it is normal or not (step S701). More specifically, the rewrite processing unit 113 determines whether data for inspection stored in advance for data to be rewritten agrees with data to be inspected created based on data to be rewritten currently stored in the auxiliary memory unit 103. The data to be inspected is created by a scheme same as that for data for inspection. If the data to be rewritten is normal, the process proceeds to step S601, and if not, the process proceeds to step S703.

In step S601, the rewrite processing unit 113 rewrites a region to be rewritten in the auxiliary memory unit 103. After that, the rewrite processing unit 113 creates data for inspection based on rewritten data, and stores it in a nonvolatile storage medium (step S702), and the process exits.

In step S703, the rewrite processing unit 113 performs a predetermined error process. The predetermined error process includes omitting future rewriting of data to be rewritten that has been determined as not being normal in step S701, storing the result of inspection in step S701 as a log in a nonvolatile storage medium, for example.

As described above, the main memory data rewriting device according to the present modification inspects data to be rewritten to determine whether its content is normal or not, using data for inspection. Consequently, according to the main memory data rewriting device according to the present modification, normalcy/abnormality of data to be rewritten can be confirmed, and appropriate rewriting can be performed.

(Second Modification)

Figure 8:
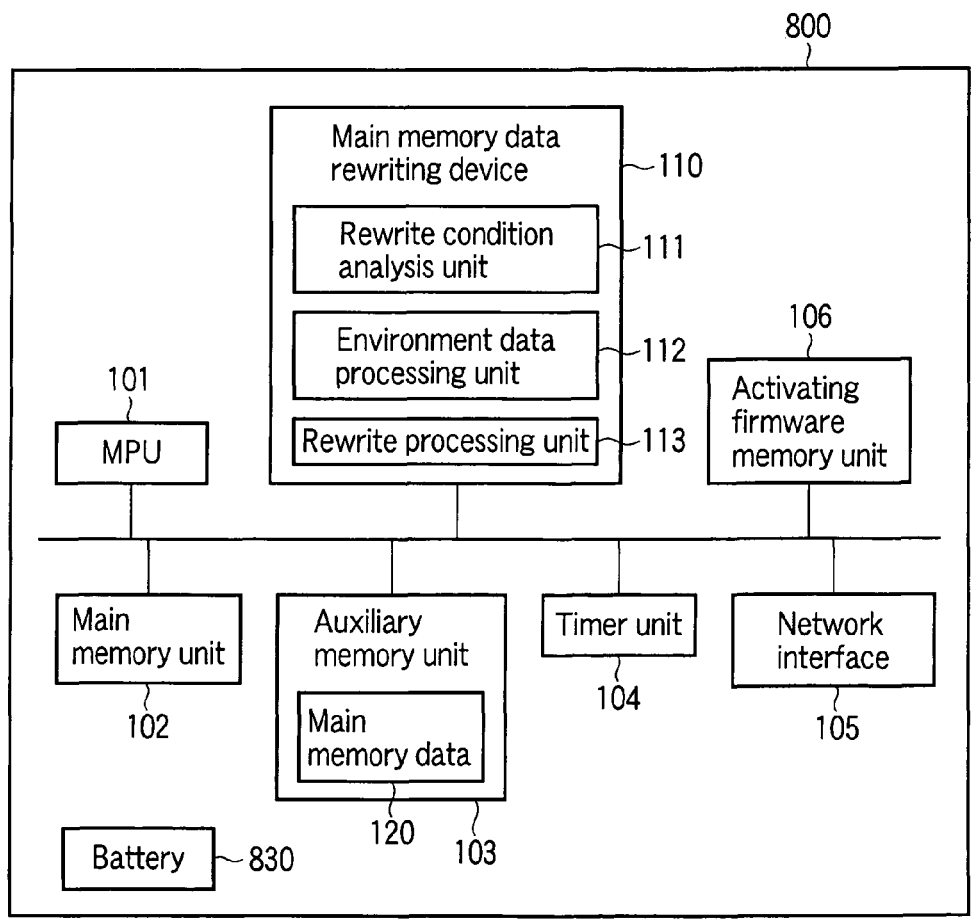
FIG. 8 is a block diagram illustrating a modification of FIG. 1.

As shown in FIG. 8, an information processing device 800 in which a main memory data rewriting device 110 according to the second modification of the present embodiment is incorporated, further includes a battery unit 830 provided in the information processing device 100 of FIG. 1. In the descriptions that follow, the elements in FIG. 8 same as those of FIG. 1 will be denoted by the same reference numerals, and different elements will mostly be discussed. That is, the information processing device 800 is an information processing device capable of driving a battery as a power supply, such as a notebook PC.

The battery unit 830 has a function of supplying power to structural elements of the information processing device 800, a function (i.e., charging function) of storing power obtained from outside of the information processing device 800, a function of measuring an amount of battery remaining (amount of power), and so forth. The battery unit 830 is formed of a battery pack including a nickel hydride battery, a lithium ion battery, or so forth.

When driven by the battery unit 830, the information processing device 800 is excellent in portability but can operate for a relatively short time, compared to when driven by an external power supply, due to the limited amount of usable power. That is, when driven by the battery unit 830, the information processing device 800 should desirably suppress power consumption to secure a longer operable time. However, execution of the main memory data rewriting process needs temporary activation of the information processing device 800 and consumes power to some degree. Therefore, in the present modification, the main memory data rewriting process is partially modified to secure a longer operable time of the information processing device 800.

First, the OS derives a minimum activation time interval, which will be described later, before the next activation time is set in the above-described step S204. To derive the minimum activation time interval, the OS calculates a maximum number of times of executions based on the following expression (1):

$$\text{maximum number of times of execution} = \frac{\text{amount of usable battery remaining}}{\text{power consumption by one-time execution}}$$

In expression (1), the "amount of usable battery remaining" refers to the remaining amount of battery in the battery unit 830 that can be used for the main memory data rewriting process. To the "amount of usable battery remaining", a measured value obtained by the above-described measurement function of the remaining amount of battery may be directly applied, or a value obtained by deducting a predetermined value from a measured value in advance may be applied. The predetermined value is the minimum amount of power that needs to be held for some reason, for example, the reason that the information processing device 800 needs to perform some processing upon resumption of operation, for example. The predetermined value may be determined by design.

In expression (1), "power consumption by one-time execution" refers to the amount of power necessary to execute the main memory data rewriting process once. The "power consumption by one-time execution" can be calculated by recording a history of a time interval from start (i.e., power-on of the information processing device 800) of a main memory data rewriting process to end (i.e., power-off of the information processing device 800) of the main memory data rewriting process, and multiplying a mean, mode, or median of the time interval included in the history by a power consumption per unit time. A value measured upon design or a value theoretically calculated from contents of the design may be used as the power consumption per unit time. A scheme of calculating the "power consumption by one-time execution" is not limited thereto, and any calculation schemes can be used.

In expression (1), the "maximum number of times of execution" refers to the limit number of times of the main memory data rewriting process that can be executed before the amount of usable battery remaining becomes exhausted. After that, the OS derives a minimum activation time interval based on the following expression (2):

$$\text{minimum activation time interval} = \frac{\text{typical deactivating period}}{\text{maximum number of times execution}}$$

In expression (2), "typical deactivating period" refers to a typical value of a period of time (time interval) from deactivation of the information processing device 800 by hibernation to resumption of operation corresponding to the deactivation. For example, by recording a history of a time interval between a deactivation time by hibernation and an operation resumption time corresponding to the deactivation time, a mean, a mode, or a median of the time interval included in the history may be used as the typical deactivating period.

In expression (2), "minimum activation time interval" refers to the minimum activation time interval necessary to execute the main memory data rewriting process to avoid exhaustion of the amount of usable battery remaining during the "typical deactivating period".

In step S204, the OS sets a next activation time in consideration of the minimum activation time interval. That is, the OS sets the next activation time with a time interval at least longer than the minimum activation time interval with reference to the present time (that is, the set time of the next activation time). In step S505, the environment data processing unit 112 sets the activation time using a similar scheme.

As described above, the main memory data rewriting device according to this modification performs the main memory data rewriting process in consideration of the amount of battery remaining. Therefore, the main memory data rewriting device according to this modification is capable of preventing exhaustion of the amount of battery remaining through the main memory data rewriting process.

Note that the above-described minimum activation time interval is merely a predicted value calculated based on ideal conditions, and exhaustion of the amount of battery remaining due to the main memory data rewriting process should not be considered never to happen. Accordingly, to prevent exhaustion of the amount of battery remaining with a higher probability, the amount of battery remaining in the battery unit 830 may be measured whenever the main memory data rewriting process is performed, and if the amount of battery remaining falls below a threshold value, the subsequent main memory data rewriting processes may be omitted. Further, in consideration of the case where the battery unit 830 is charged after the amount of battery remaining falls below the threshold value, the minimum activation time interval may be recalculated whenever the main memory data rewriting process is executed, or whenever charge of the battery unit 830 is detected.

(Third Modification)

A main memory data rewriting device 110 according to the third modification of the present embodiment is incorporated in an information processing device comprising a battery unit 830, such as the information processing device 800 of FIG. 8, as in the case of the main memory data rewriting device 110 according to the above-described second modification.

In step S202, the OS adds, to the writing condition, priorities assigned to data types to be rewritten. These priorities represent priorities for rewriting data in the main memory data rewriting process. For example, in a situation where the amount of battery remaining is relatively small (i.e., lower than a reference value), the main memory data rewriting process is omitted for the data type with a lower priority (lower than a level corresponding to the reference value), from the view point of saving power consumption. The priorities may be set in two levels, or may be set in more than two levels. Note that the priorities that should be assigned to the data types are not uniquely defined, and can vary according to the contents of design of the information processing device 800. In the descriptions that follow, the priorities are set in two levels, and FIG. 9 illustrates the contents of the rewrite condition creating process when a higher priority is assigned to an IP address and a lease expiration time of the IP address, and a lower priority is assigned to an encryption key and an expiration time of the encryption key.

First, the OS acquires an IP address assigned to the network interface 105 and a physical address on the main memory unit 102 storing a lease expiration time for the IP address (step S901). Further, the OS acquires a physical address on the main memory unit 102 that stores an encryption key used for encryption of communications performed by the network interface 105, and an expiration time of the encryption key (step S902).

Then, the OS converts a physical address on the main memory unit 102 acquired in each of steps S901 and S902 into a physical address on the auxiliary storage device 103 (step S903). That is, the OS creates a physical address, which indicates a region to be rewritten on the auxiliary storage device 103, and in which data to be rewritten is saved during a deactivating period of the information processing device 800, as part of the writing condition.

Then, the OS determines whether the amount of battery remaining in the battery unit 830 is less than a predetermined reference value (step S904). The predetermined reference value is determined by design. If the amount of battery remaining is less than the reference value, the process of rewriting the encryption key with a lower priority and the expiration time of the encryption key is not performed, and the process proceeds with step S905. If the amount of battery remaining is more than the reference value, the process of rewriting an encryption key with a lower priority and an expiration time of the encryption key is also performed, and the process proceeds with step S906.

In step S905, since only an IP address with a higher priority and a lease expiration time of the IP address are to be rewritten in the main memory data rewriting process, a next activation time is calculated based on only the lease expiration time of the IP address, and the process exits.

In step S906, since an encryption key with a lower priority and an expiration time of the encryption key as well as an IP address with a higher priority and a lease expiration time of the IP address, are to be rewritten in the main memory data rewriting process, the OS calculates a next activation time based on the lease expiration time of the IP address and the expiration time of the expiration time of the encryption key, and the process exits.

In the above-described step S403, the environment data processing unit 112 should desirably perform the processing same as that of the steps S904 to S906.

As described above, the main memory data rewriting device according to the present modification assigns priorities for performing the main memory data rewriting process to data types to be rewritten. Thus, the main memory data rewriting device according to the present modification is capable of achieving efficiency in power consumption by narrowing down data to be rewritten in the main memory data rewriting process to the data types with relatively high priorities in a situation where the amount of battery remaining is relatively small.

(Second Embodiment)

As shown in FIG. 10, an information processing device 1000, in which a main memory data rewriting device 110 is incorporated, according to the second embodiment of present invention is formed by replacing the main memory unit 102 with a main memory 1002 in the information processing device 100 shown in FIG. 1. In the descriptions that follow, the same elements in FIG. 10 as those of FIG. 1 will be denoted by the same reference numerals, and different elements will mostly be discussed.

The main memory 1002 temporarily stores data needed by software executed by an MPU 101. The main memory 1002 is formed of a nonvolatile storage medium, and stored data will not be lost upon interruption of power supply. The main memory 1002 is formed of an Erasable Programmable Read Only Memory (EEPROM), a NOR type flash memory, a NAND type flash memory, a Ferroelectric Random Access Memory (FeRAM), and a Magnetoresistive Random Access Memory (MRAM), or so forth. In particular, FeRAM and MRAM promises a high-speed processing performance and a high rewriting performance comparable to DRAM, and are preferable for the main memory 1002 that requires high-speed and high-frequency reading and writing.

Since the main memory unit 102 of FIG. 1 is formed of a volatile storage medium, the OS saves the main memory data 120 in an auxiliary storage device 103 formed of a nonvolatile storage medium before deactivation by hibernation. Since the main memory 1002 is formed of a nonvolatile storage medium, however, the main memory data 1020 does not need to be moved. Accordingly, a hibernation transition process by an OS being executed by an MPU 101 is equivalent to contents of the process of FIG. 2 from which the step S205 (process of saving main memory data) is removed, as shown in FIG. 11.

Further, in the information processing device 1000, a region to be rewritten exists not on the auxiliary storage device 103 but on the main memory 1002. Accordingly, when the OS performs a rewrite condition creating process as shown in FIG. 4, the process (process of converting a physical address on the main memory 1002 storing data to be rewritten into a physical address on the auxiliary storage device 103) equivalent to the step S402 is unnecessary, as shown in FIG. 12.

Further, when the information processing device 100 of FIG. 1 is powered on by a user operation (press-down of the power button, for example), the OS performs a process of writing the main memory data 120 stored in the auxiliary storage device 103, for example, in the main memory unit 102 again, as a process of resumption of operation. Since the main memory data 1020 is stored in the main memory 1002, however, when the information processing device 1000 is powered on by a user operation, the OS is capable of resuming operation by directly using the main memory data 1020.

As described above, the main memory data rewriting device according to the present embodiment is configured to rewrite the main memory data maintained in the main memory formed of a nonvolatile storage medium in a deactivating period of the information processing device, according to the rewrite condition created by an OS for each item of data to be rewritten in the deactivating period before deactivation of the information processing device. Thereby, the main memory data rewriting device according to the present embodiment is capable of rewriting main memory data maintained in a nonvolatile storage medium in a deactivating period of an information processing device. That is, the main memory data rewriting device according to the present embodiment enables high-speed resumption of operation of the information processing device.

(Third Embodiment)

Figure 13:
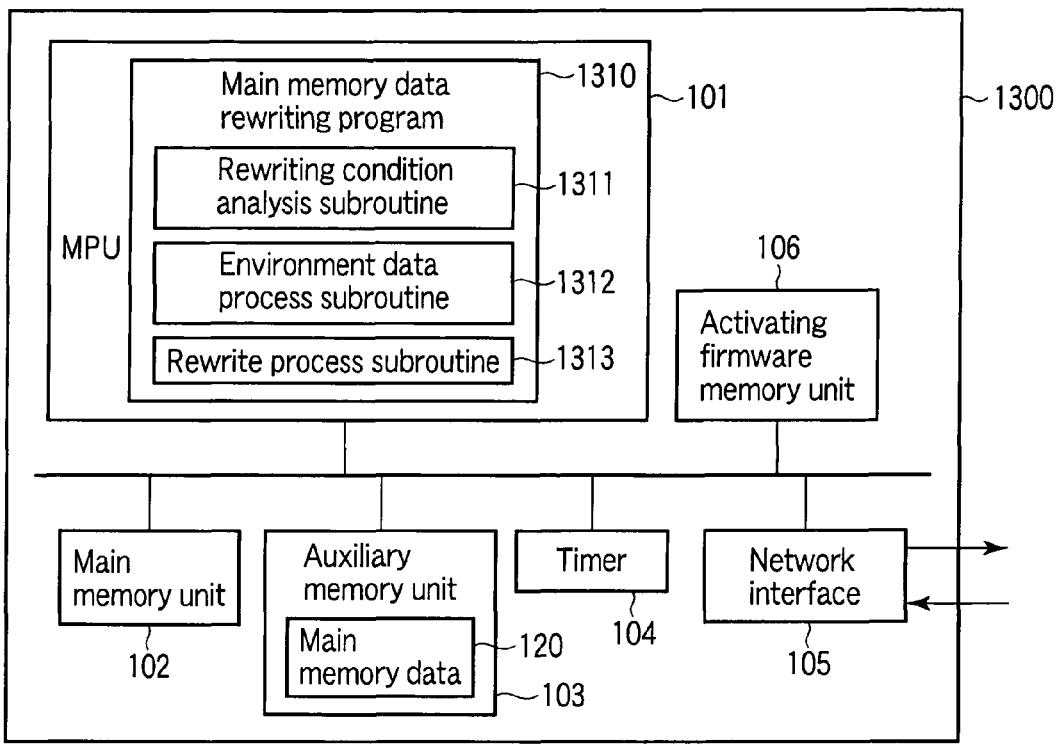
FIG. 13 is a block diagram illustrating an information processing device which executes a main memory data rewriting program according to the third embodiment.

As shown in FIG. 13, an information processing device 1300 according to the third embodiment, which executes a main memory data rewriting program 1310, is formed of the information processing device 100 shown in FIG. 1, from which the main memory data rewriting device 110 is removed. In the descriptions that follow, the same elements will be denoted by the same reference numerals, and different elements will mostly be discussed.

The main memory data rewriting program 1310 is a program for operating the MPU 101 as the above-described main memory data rewriting device 110. The main memory data rewriting program 1310 may be maintained in a nonvolatile storage medium (an auxiliary storage device 103, an activating firmware memory unit 106, and so forth) provided in the information processing device 1300, may be maintained in an optical disc such as CD-R, CD-RW, DVD-R, and DVD-RAM, a magneto-optical disc such as MO, or a removal disc such as a semiconductor memory, or may be distributed via a network and installed.

The main memory data rewriting program 1310 comprises a rewrite condition analysis subroutine 1311 for operating the MPU 101 as the above-described rewrite condition analysis unit 111, an environment data process subroutine 1312 for operating the MPU 101 as the above-described environment data processing unit 112, and a rewriting process subroutine 1313 for operating the MPU 101 as the above-described rewrite processing unit 113.

FIG. 13 illustrates the rewrite condition analysis subroutine 1311, the environment data process subroutine 1312 and the rewriting process subroutine 1313 as if they were executed simultaneously by the MPU 101, but there is no necessity for all the subroutines to be executed simultaneously by the MPU 101. Further, the main memory data rewriting program 1310 may be implemented as a program activated by an activating firmware, or may be implemented on the activating firmware to incorporate a function of the main memory data rewriting program 1310.

Further, when the MPU 101 has a plurality of cores, or when a plurality of processors similar to the MPU 101 are incorporated in the information processing device 1300, the main memory data rewriting program 1310 may be executed by one of the cores or processors. In principle, the main memory data rewriting program 1310 and the OS do not need to be executed simultaneously, but the rewrite condition analysis subroutine 1311 and the OS need to be executed in parallel.

As described above, the main memory data rewriting program according to the present embodiment rewrites the main memory data saved in an external storage during a deactivating period of information processing device, according to the rewrite condition created by the OS for each item of data which may be rewritten during the deactivating period before deactivation of the information processing device. Consequently, the main memory data rewriting program according to the present embodiment is capable of rewriting main memory data maintained in a nonvolatile storage medium in a deactivating period of an information processing device. That is, the main memory data rewriting program according to the present embodiment enables high-speed resumption of operation of an information processing device.

(Fourth Embodiment)

Figure 14:
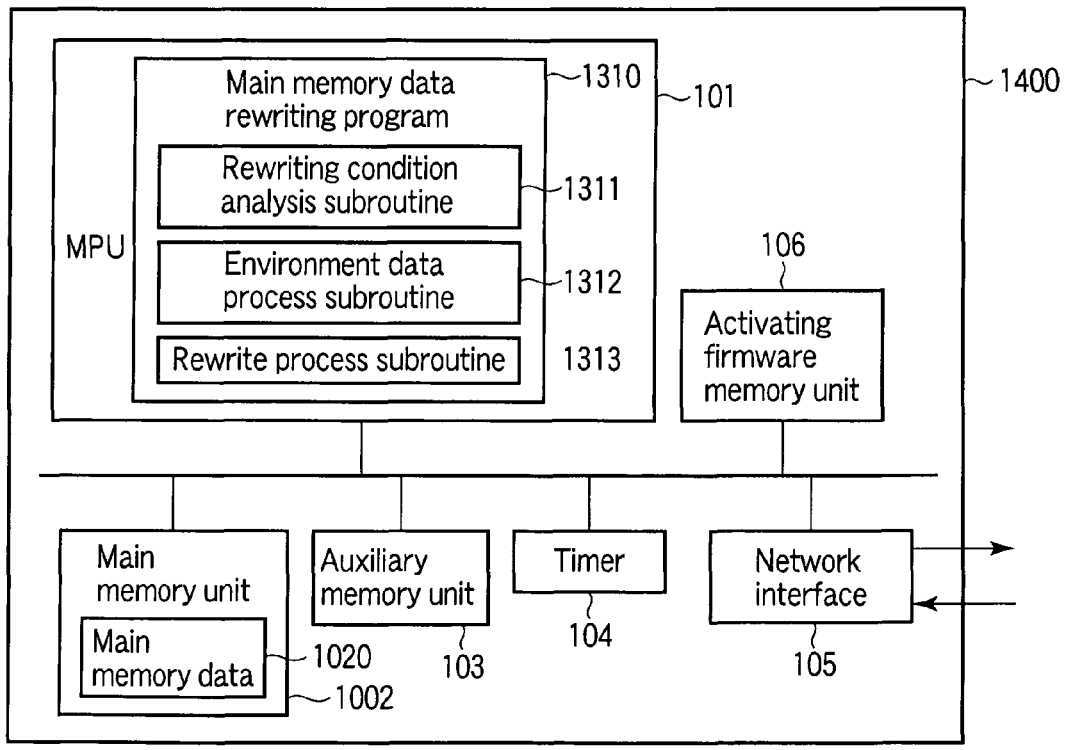
FIG. 14 is a block diagram illustrating an information processing device which executes a main memory data rewriting program according to the fourth embodiment.

As shown in FIG. 14, an information processing device 1400 which executes a main memory data rewriting program 1310 according to the fourth embodiment of the present invention is formed of the information processing device 1000 shown in FIG. 10 from which the main memory data rewriting device 110 is removed.

The main memory data rewriting program according to the present embodiment rewrites main memory data maintained in a main memory formed of a nonvolatile storage medium in a deactivating period of an information processing device, according to a rewrite condition created by an OS for each item of data which may be rewritten in a deactivating period before deactivation of the information processing device. Thus, according to the main memory data rewriting program to according to the present embodiment, main memory data maintained in a nonvolatile storage medium in a deactivating period of an information processing device can be rewritten. That is, the main memory data rewriting program according to the present embodiment enables high-speed resumption of operation of an information processing device.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

For example, a sensor for acquiring information regarding external physical environments may be incorporated in the information processing device according to each of the above-described embodiments. The sensor may be one of or an appropriate combination of a temperature sensor, a humidity sensor, an atmospheric pressure sensor (altitude sensor), an acceleration sensor, a position sensor, a brightness sensor (light intensity sensor), a living body sensor (such as a fingerprint sensor, a finger vein sensor, a palm vein sensor, an iris sensor, and a face sensor). By detecting physical displacement of the information processing device using the sensor, the environment data processing unit (or an environment data processing subroutine) may be configured to acquire environment data via another sensor or the network interface using detection of the physical movement as a trigger.

Further, in the information processing device, the structural elements are connected via a common bus, but the common bus may be connected via a plurality of wires, may be connected via a wire having a hierarchical structure, or may be connected via a wire called cross bar switch. Further, some of the structural elements may be formed of System on Chip (SoC) mounted on the same semiconductor chip.

Needless to say, the present invention can be implemented by making various other modifications within the scope of the present invention.

What is claimed is:

1. A system comprising a main memory and a main memory data rewriting device, said main memory data rewriting device comprising:

a rewrite condition analysis unit configured to analyze a rewrite condition for target data included in main memory data stored in a main memory before deactivation of an information processing device, and create a first processing content to acquire environment data substituting the target data from outside of the information processing device and a second processing content to rewrite the target data to the environment data, the rewrite condition being created by an operating system having a function of deactivating the information processing device and maintaining the main memory data in a nonvolatile storage medium over a deactivating period of the information processing device;

an environment data processing unit configured to acquire the environment data according to the first processing content when the information processing device is temporarily activated at an activation time set to rewrite the target data during the deactivating period; and a rewrite processing unit configured to rewrite a region of the nonvolatile storage medium in which the target data is stored with the environment data according to the second processing content.

2. The system according to claim 1, wherein the rewrite condition includes a data type of the target data and a physical address identifying the region of the nonvolatile storage medium in which the target data is stored, the environment data processing unit acquires environment data matching the data type via a data input-output unit provided in the information processing device when the information processing device is temporarily activated at the activation time during the deactivating period, and the rewrite processing unit rewrites the region of the nonvolatile storage medium identified by the physical address with the environment data.

3. The system according to claim 2, wherein the nonvolatile storage medium forms an auxiliary storage different from the main memory.

4. The system according to claim 2, wherein the nonvolatile storage medium forms the main memory.

5. The system according to claim 2, wherein the rewrite processing unit (a) compares data for inspection created based on the target data with data to be inspected created based on the target data after the environment data processing unit has acquired the environment data, (b) rewrites a region of the nonvolatile storage medium specified by the physical address with the environment data and creates a new data for inspection based on rewritten target data, if the data to be inspected and the data for inspection are coincident, and (c) omits rewriting of the target data if the data to be inspected and the data for inspection are not coincident.

6. The system according to claim 2, wherein the activation time is set with a time interval at least longer than a minimum activation time interval necessary for avoiding exhaustion of a remaining amount of battery which drives the information processing device during the deactivating period, with reference to a setting timing of the activation time.

7. The system according to claim 6, wherein the rewrite condition includes at least two levels of priorities which are assigned to data types of the target data, and the activation time is set only for target data belonging to a data type of a priority at a level higher than a level corresponding to a reference value, if the remaining amount of battery is less than the reference value.

8. A main memory data rewriting method comprising:

analyzing a rewrite condition for target data included in main memory data stored in a main memory before deactivation of an information processing device, and creating a first processing content to acquire environment data substituting the target data from outside of the information processing device and a second processing content to rewrite the target data to the environment data, the rewrite condition being created by an operating system having a function of deactivating the information processing device and maintaining the main memory data in a nonvolatile storage medium over a deactivating period of the information processing device;

acquiring the environment data according to the first processing content when the information processing device is temporarily activated at an activation time set to rewrite the target data during the deactivating period; and rewriting a region of the nonvolatile storage medium in which the target data is stored with the environment data according to the second processing content.

9. A non-transitory computer readable storage medium storing instructions of a computer program which when executed by an information processing device result in performance of steps comprising:

analyzing a rewrite condition for target data included in main memory data stored in a main memory before deactivation of the information processing device, and creating a first processing content to acquire environment data substituting the target data from outside of the information processing device and a second processing content to rewrite the target data to the environment data, the rewrite condition being created by an operating system having a function of deactivating the information processing device and maintaining the main memory data in a nonvolatile storage medium over a deactivating period of the information processing device;

acquiring the environment data according to the first processing content when the information processing device is temporarily activated at an activation time set to rewrite the target data during the deactivating period; and rewriting a region of the nonvolatile storage medium in which the target data is stored with the environment data according to the second processing content.

* * * * *